(12) United States Patent
Ito et al.

(10) Patent No.: US 12,512,476 B2
(45) Date of Patent: Dec. 30, 2025

(54) DISPERSANT COMPOSITION FOR ELECTROCHEMICAL DEVICE, CONDUCTIVE MATERIAL DISPERSION LIQUID FOR ELECTROCHEMICAL DEVICE, SLURRY COMPOSITION FOR ELECTROCHEMICAL DEVICE ELECTRODE AND METHOD OF PRODUCING SAME, ELECTRODE FOR ELECTROCHEMICAL DEVICE, AND ELECTROCHEMICAL DEVICE

(71) Applicant: ZEON CORPORATION, Tokyo (JP)

(72) Inventors: Yukie Ito, Tokyo (JP); Akito Nakai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 18/006,148

(22) PCT Filed: Aug. 26, 2021

(86) PCT No.: PCT/JP2021/031415
§ 371 (c)(1),
(2) Date: Jan. 20, 2023

(87) PCT Pub. No.: WO2022/045266
PCT Pub. Date: Mar. 3, 2022

(65) Prior Publication Data
US 2024/0088391 A1    Mar. 14, 2024

(30) Foreign Application Priority Data

Aug. 31, 2020  (JP) .................. 2020-146302

(51) Int. Cl.
*H01M 4/62* (2006.01)
*C08F 236/12* (2006.01)
*H01G 11/38* (2013.01)
*H01G 11/86* (2013.01)
*H01M 4/02* (2006.01)

(52) U.S. Cl.
CPC .......... *H01M 4/622* (2013.01); *C08F 236/12* (2013.01); *H01G 11/38* (2013.01); *H01G 11/86* (2013.01); *C08F 2800/20* (2013.01); *H01M 2004/021* (2013.01)

(58) Field of Classification Search
CPC ............ H01M 4/622; H01M 2004/021; C08F 236/12; C08F 2800/20
See application file for complete search history.

(56) References Cited

U.S. PATENT DOCUMENTS

| 10,388,961 | B2 | 8/2019 | Fukumine et al. | |
| 11,145,866 | B2 | 10/2021 | Maeda et al. | |
| 2011/0157773 | A1* | 6/2011 | Sasaki | H01G 11/42 |
| | | | | 361/502 |
| 2014/0038041 | A1 | 2/2014 | Ichiro et al. | |
| 2014/0178756 | A1 | 6/2014 | Ishii et al. | |
| 2016/0013471 | A1* | 1/2016 | Kaseda | H01M 4/131 |
| | | | | 429/223 |
| 2016/0376421 | A1 | 12/2016 | Obrecht | |
| 2018/0277848 | A1* | 9/2018 | Matsumura | H01M 10/0525 |
| 2019/0229339 | A1* | 7/2019 | Maeda | C08F 236/12 |

FOREIGN PATENT DOCUMENTS

| CN | 105849955 A | * | 8/2016 | ............ H01M 4/622 |
| CN | 107540792 A | | 1/2018 | |
| CN | 107710469 A | * | 2/2018 | ........ H01M 10/0562 |
| CN | 107710472 A | | 2/2018 | |
| CN | 109180871 A | | 1/2019 | |
| CN | 109643801 A | | 4/2019 | |
| EP | 3512013 A1 | | 7/2019 | |
| JP | 2003100298 A | | 4/2003 | |
| JP | 2005294575 A | | 10/2005 | |
| JP | 4311002 B2 | | 8/2009 | |
| JP | 2013127960 A | | 6/2013 | |
| JP | 2016021390 A | | 2/2016 | |
| JP | 2016196668 A | | 11/2016 | |
| JP | 2018145434 A | | 9/2018 | |
| KR | 1020160102404 A | | 8/2016 | |
| WO | 2012111472 A1 | | 8/2012 | |
| WO | 2013008564 A1 | | 1/2013 | |
| WO | WO-2014097309 | * | 6/2014 | ............ B60R 19/023 |
| WO | WO-2014157061 A1 | * | 10/2014 | .............. H01M 4/13 |
| WO | 2015020280 A1 | | 2/2015 | |

(Continued)

OTHER PUBLICATIONS

Nov. 16, 2021, Written Opinion of the International Searching Authority issued in the International Patent Application No. PCT/JP2021/031415.
Aug. 3, 2023, the Supplementary European Search Report issued by the European Patent Office in the corresponding European Patent Application No. 21861688.6.
Aug. 17, 2023, Communication pursuant to Article 94(3) EPC issued by the European Patent Office in the corresponding European Patent Application No. 21861688.6.
Feb. 28, 2023, International Preliminary Report on Patentability issued in the International Patent Application No. PCT/JP2021/031415.
Feb. 29, 2024, Communication pursuant to Article 94(3) EPC issued by the European Patent Office in the corresponding European Patent Application No. 21861688.6.

(Continued)

*Primary Examiner* — Ula C Ruddock
*Assistant Examiner* — Olivia Mason Ruggiero
(74) *Attorney, Agent, or Firm* — KENJA IP LAW PC

(57) ABSTRACT

A dispersant composition for an electrochemical device contains a polymer including a nitrile group-containing monomer unit and an alkylene structural unit. Upon measurement of the polymer contained in the composition by dynamic light scattering, a value (A) detected for volume-average particle diameter D50 is not less than 50 nm and not more than 800 nm, and one or more peaks are detected in a particle diameter range of not less than 5 μm and not more than 30 μm.

9 Claims, No Drawings

(56) References Cited

FOREIGN PATENT DOCUMENTS

WO  2015098116 A1  7/2015
WO  2015101599 A1  7/2015

OTHER PUBLICATIONS

"Particle size distribution analyzer", specification of ELSZ-2000S, webpage <http://www.otsukael.com:80/product/detail/productid/1>, Oct. 27, 2017, retrieved from Internet Archive Wayback Machine <https://web.archive.org/web/20171027075152/http://www.otsukael.com:80/product/detail/productid/1> on Sep. 24, 2025.
Particle Metrix, Dynamische Lichtstreuung—Bestimmung der Partikelgrößenverteilung kolloidaler Stoffe, 2004.
Sep. 10, 2025, Communication of notices of opposition (R. 79(1) EPC) issued by the European Patent Office in the corresponding European Patent No. 4113653.
Sep. 3, 2025, Communication of a notice of opposition issued by the European Patent Office in the corresponding European Patent No. 4113653.

\* cited by examiner

DISPERSANT COMPOSITION FOR ELECTROCHEMICAL DEVICE, CONDUCTIVE MATERIAL DISPERSION LIQUID FOR ELECTROCHEMICAL DEVICE, SLURRY COMPOSITION FOR ELECTROCHEMICAL DEVICE ELECTRODE AND METHOD OF PRODUCING SAME, ELECTRODE FOR ELECTROCHEMICAL DEVICE, AND ELECTROCHEMICAL DEVICE

TECHNICAL FIELD

The present disclosure relates to a dispersant composition for an electrochemical device, a conductive material dispersion liquid for an electrochemical device, a slurry composition for an electrochemical device electrode and method of producing the same, an electrode for an electrochemical device, and an electrochemical device.

BACKGROUND

Electrochemical devices such as lithium ion secondary batteries have characteristics such as compact size, light weight, high energy density, and the ability to be repeatedly charged and discharged, and are used in a wide variety of applications. Consequently, in recent years, studies have been made to improve battery members such as electrodes with the aim of achieving even higher electrochemical device performance.

An electrode used in an electrochemical device such as a lithium ion secondary battery generally includes a current collector and an electrode mixed material layer formed on the current collector. The electrode mixed material layer is formed, for example, through application and drying on the current collector of a slurry composition that contains an electrode active material, a carbon material (conductive carbon) as a conductive material, and at least one type of polymer serving as a binder or dispersant dispersed in a solvent.

Attempts have been made to improve slurry compositions used in the formation of electrode mixed material layers in recent years with the aim of achieving further improvement of electrochemical device performance. Hydrogenated nitrile rubbers satisfying various chemical compositions and attributes have been compounded in the production of slurry compositions with the expectation of such rubbers acting as binders.

Due to the general-purpose nature of hydrogenated nitrile rubbers, attempts have been made to modify hydrogenated nitrile rubbers in accordance with the application thereof. For example, Patent Literature (PTL) 1 discloses a hydrogenated nitrile rubber in which the content of a specific substituted phenol is within a specific range. Through the hydrogenated nitrile rubber described in PTL 1, it is possible to obtain a vulcanizate that has a good elastic modulus and a low compression set value after being stored at high temperature.

CITATION LIST

Patent Literature

PTL 1: JP2018-145434A

SUMMARY

Technical Problem

In recent years, there has been demand for even better rate characteristics and high-temperature storage characteristics in electrochemical devices such as secondary batteries. There has also been demand for a slurry composition for an electrochemical device electrode that is used in production of an electrochemical device to have excellent dispersion state stability over time. However, there is room for further improvement of dispersion state stability over time in a conventional slurry composition. There is also room for further improvement of rate characteristics and high-temperature storage characteristics in an electrochemical device such as a secondary battery that is produced using a conventional slurry composition.

Accordingly, one object of the present disclosure is to provide a dispersant composition for an electrochemical device and a conductive material dispersion liquid for an electrochemical device containing this dispersant composition that can produce a slurry composition having excellent dispersion state stability over time and that can enhance rate characteristics and high-temperature storage characteristics of an obtained electrochemical device.

Another object of the present disclosure is to provide a slurry composition for an electrochemical device electrode, and method of producing the same, that has excellent dispersion state stability over time and that can enhance rate characteristics and high-temperature storage characteristics of an obtained electrochemical device.

Yet another object of the present disclosure is to provide an electrode for an electrochemical device that can sufficiently improve rate characteristics and high-temperature storage characteristics of an electrochemical device and an electrochemical device that has excellent rate characteristics, high-temperature storage characteristics, and so forth.

Solution to Problem

The inventors conducted diligent investigation with the aim of solving the problems set forth above. The inventors made new findings that a composition containing a polymer that has a specific chemical composition and for which, upon measurement by dynamic light scattering, a value (A) detected for volume-average particle diameter D50 is not less than 50 nm and not more than 800 nm and one or more peaks are detected in a particle diameter range of not less than 5 μm and not more than 30 μm, is useful as a dispersant for an electrochemical device, and that by using this composition, it is possible to produce a slurry composition having excellent dispersion state stability over time and to enhance rate characteristics and high-temperature storage characteristics of an obtained electrochemical device. In this manner, the inventors completed the present disclosure.

Specifically, the present disclosure aims to advantageously solve the problems set forth above, and a presently disclosed dispersant composition for an electrochemical device comprises a polymer including a nitrile group-containing monomer unit and an alkylene structural unit, wherein upon measurement of the polymer by dynamic light scattering, a value (A) detected for volume-average particle diameter D50 is not less than 50 nm and not more than 800 nm, and one or more peaks are detected in a particle diameter range of not less than 5 μm and not more than 30 μm. Through a composition containing a polymer that has a specific chemical composition and for which, upon measurement by dynamic light scattering, a value (A) detected for volume-average particle diameter D50 is not less than 50 nm and not more than 800 nm and one or more peaks are detected in a particle diameter range of not less than 5 μm and not more than 30 μm in this manner, it is possible to produce a slurry composition having excellent dispersion state stability over time and to enhance rate characteristics and high-temperature storage characteristics of an obtained electrochemical device.

Note that it is possible to judge whether a given polymer includes a specific monomer unit or a specific structural unit through a nuclear magnetic resonance (NMR) method such as $^1$H-NMR. Also note that when a given polymer is said to "include a monomer unit", this means that "a polymer obtained using that monomer includes a repeating unit derived from the monomer".

Moreover, measurement of a polymer by dynamic light scattering can be performed according to a method described in the EXAMPLES section.

In the presently disclosed dispersant composition for an electrochemical device, it is preferable that when a value for a particle diameter corresponding to a largest peak among the one or more peaks that are detected in the particle diameter range of not less than 5 μm and not more than 30 μm upon measurement of the polymer by dynamic light scattering is taken to be (B), a parameter (B/A) that is obtained by dividing the value (B) for the particle diameter by the value (A) for the volume-average particle diameter D50 has a value of not less than 7 and not more than 300. When the value of the parameter (B/A) is not less than 7 and not more than 300, dispersion state stability over time of an obtained slurry composition can be further increased, and rate characteristics of an obtained electrochemical device can be further enhanced.

In the presently disclosed dispersant composition for an electrochemical device, proportional content of the nitrile group-containing monomer unit in the polymer is preferably not less than 10 mass % and not more than 60 mass %. When the proportional content of the nitrile group-containing monomer unit in the polymer is within the range set forth above, dispersion state stability over time of an obtained slurry composition and rate characteristics and high-temperature storage characteristics of an obtained electrochemical device can be further enhanced.

Note that the proportion constituted by a monomer unit or the like in a given polymer can be measured by a nuclear magnetic resonance (NMR) method such as $^1$H-NMR.

The dispersant composition for an electrochemical device preferably further comprises not less than 0.01 mass % and not more than 0.2 mass % of a substituted phenol compound based on total mass of the polymer. Through a dispersant composition for an electrochemical device that contains a substituted phenol compound in the range set forth above, it is possible to further enhance dispersion state stability over time of an obtained slurry composition and rate characteristics and high-temperature storage characteristics of an obtained electrochemical device.

Moreover, the present disclosure aims to advantageously solve the problems set forth above, and a presently disclosed conductive material dispersion liquid for an electrochemical device comprises: a conductive material; a solvent; and any one of the dispersant compositions for an electrochemical device set forth above. Through a conductive material dispersion liquid for an electrochemical device that contains the dispersant composition for an electrochemical device set forth above, a conductive material, and a solvent in this manner, it is possible to obtain a slurry composition having excellent dispersion state stability over time and an electrochemical device having excellent rate characteristics and high-temperature storage characteristics.

Furthermore, the present disclosure aims to advantageously solve the problems set forth above, and a presently disclosed slurry composition for an electrochemical device electrode comprises: an electrode active material; a conductive material; and any one of the dispersant compositions set forth above. A slurry composition for an electrochemical device electrode that contains an electrode active material, a conductive material, and any one of the dispersant compositions set forth above has excellent dispersion state stability over time and can enhance rate characteristics and high-temperature storage characteristics of an obtained electrochemical device.

Also, the present disclosure aims to advantageously solve the problems set forth above, and a presently disclosed method of producing a slurry composition for an electrochemical device electrode comprises: a first step of mixing the polymer, the conductive material, and a solvent to produce a conductive material dispersion liquid; and a second step of mixing the conductive material dispersion liquid obtained in the first step and the electrode active material. The presently disclosed production method set forth above enables efficient production of the presently disclosed slurry composition for an electrochemical device electrode set forth above.

Moreover, the present disclosure aims to advantageously solve the problems set forth above, and a presently disclosed electrode for an electrochemical device comprises an electrode mixed material layer formed using the slurry composition for an electrochemical device electrode set forth above. Using the slurry composition for an electrochemical device electrode set forth above in this manner enables good formation of an electrode for an electrochemical device that can sufficiently improve rate characteristics and high-temperature storage characteristics of an electrochemical device.

Furthermore, the present disclosure aims to advantageously solve the problems set forth above, and a presently disclosed electrochemical device comprises the electrode for an electrochemical device set forth above. By using the electrode for an electrochemical device set forth above in this manner, it is possible to sufficiently improve battery characteristics such as rate characteristics and high-temperature storage characteristics.

Advantageous Effect

According to the present disclosure, it is possible to provide a dispersant composition for an electrochemical device and a conductive material dispersion liquid for an electrochemical device containing this dispersant composition that can produce a slurry composition having excellent dispersion state stability over time and that can enhance rate characteristics and high-temperature storage characteristics of an obtained electrochemical device.

Moreover, according to the present disclosure, it is possible to provide a slurry composition for an electrochemical device electrode, and method of producing the same, that has excellent dispersion state stability over time and that can enhance rate characteristics and high-temperature storage characteristics of an obtained electrochemical device.

Furthermore, according to the present disclosure, it is possible to provide an electrode for an electrochemical device that can sufficiently improve rate characteristics and high-temperature storage characteristics of an electrochemical device and an electrochemical device that has excellent rate characteristics and high-temperature storage characteristics.

DETAILED DESCRIPTION

The following provides a detailed description of embodiments of the present disclosure.

The presently disclosed dispersant composition for an electrochemical device can be used in production of a slurry composition for an electrochemical device electrode. Moreover, a slurry composition for an electrochemical device electrode produced using the presently disclosed dispersant composition for an electrochemical device can be used in formation of an electrode of an electrochemical device. The presently disclosed slurry composition for an electrochemical device electrode can be efficiently produced according to the presently disclosed method of producing a slurry composition for an electrochemical device electrode. A feature of the presently disclosed electrochemical device is that an electrode for an electrochemical device formed using the presently disclosed slurry composition for an electrochemical device electrode is used therein.

Note that the presently disclosed dispersant composition for an electrochemical device and slurry composition for an electrochemical device can, in particular, suitably be used in formation of a positive electrode of an electrochemical device.

(Dispersant Composition for Electrochemical Device)

The presently disclosed dispersant composition for an electrochemical device is a composition that contains a polymer including a nitrile group-containing monomer unit and an alkylene structural unit. A feature of the polymer contained in this composition is that, upon measurement of the polymer by dynamic light scattering, it satisfies attributes of a value (A) detected for volume-average particle diameter D50 being not less than 50 nm and not more than 800 nm and one or more peaks being detected in a particle diameter range of not less than 5 μm and not more than 30 μm. The presently disclosed dispersant composition for an electrochemical device can optionally further contain other components in addition to the polymer that satisfies the specific chemical composition and attributes set forth above.

As a result of containing the polymer that satisfies the specific chemical composition and attributes set forth above, the presently disclosed dispersant composition for an electrochemical device (hereinafter, also referred to simply as a "dispersant composition") can produce a slurry composition having excellent dispersion state stability over time and can enhance rate characteristics and high-temperature storage characteristics of an obtained electrochemical device. Although the reason for this is not clear, it is presumed to be as follows. Firstly, the specific polymer set forth above that is a principal component of the dispersant composition is thought to be present in a state as individual polymer molecules or forming clusters of a plurality of polymer molecules in solution in a state in which the polymer is dissolved in an organic solvent such as N-methyl-2-pyrrolidone that is ordinarily used in production of an electrochemical device such as a non-aqueous secondary battery, for example. The state of the polymer in solution can be reflected in a scattering intensity distribution based on particle diameter that is obtained as a result of dynamic light scattering measurement according to a method described in the EXAMPLES section of the present specification. More specifically, the size of individual polymer molecules that do not form clusters is expressed by a value for volume-average particle diameter D50 that is determined based on the scattering intensity distribution, whereas a peak appearing in a range of particle diameters larger than the value of the volume-average particle diameter D50 can correspond to the size of clusters formed by a plurality of polymer molecules. When a dispersant composition containing a polymer that, upon dynamic light scattering measurement, satisfies attributes of a value (A) detected for volume-average particle diameter D50 being not less than 50 nm and not more than 800 nm and one or more peaks being detected in a particle diameter range of not less than 5 μm and not more than 30 μm is mixed with a conductive material and the like to produce a slurry composition, individual polymer molecules having a suitably small size cover the surface of the conductive material well and protect the conductive material while also promoting breaking up of the conductive material during production. Moreover, in the produced slurry composition, steric repulsion displayed by clusters having a suitably large size can inhibit reaggregation of the conductive material and increase dispersion state stability over time of the slurry composition. Furthermore, in a situation in which an electrode and an electrochemical device are formed using a slurry composition produced in this manner, the clusters having a suitably large size form gaps that enable movement of ions contributing to an electrochemical reaction inside the electrode and thereby enhance rate characteristics of the electrochemical device, whereas covering of the conductive material mainly by individual polymer molecules can inhibit side reactions caused by the conductive material inside the electrochemical device and can improve high-temperature storage characteristics of the electrochemical device.

<Polymer>

The polymer is a component that can function as a dispersant that disperses a conductive material and the like in a slurry composition when the dispersant composition is used to produce a slurry composition and that, in an electrode mixed material layer formed using this slurry composition, can hold components contained in the electrode mixed material layer so that the components do not detach from the electrode mixed material layer (i.e., can function as a binder).

<<Volume-Average Particle Diameter D50 of Polymer>>

The volume-average particle diameter D50 of the polymer can be measured by dynamic light scattering measurement according to a method described in the EXAMPLES section of the present specification as previously described. The volume-average particle diameter D50 of the polymer is required to be not less than 50 nm and not more than 800 nm, and, at the upper limit side, is preferably 650 nm or less, and more preferably 450 nm or less. When the volume-average particle diameter D50 of the polymer is not less than the lower limit set forth above, initial dispersion of a conductive material improves, which enables better covering of the conductive material by the polymer and can further enhance high-temperature storage characteristics of an obtained electrochemical device. Moreover, when the volume-average particle diameter D50 of the polymer is not more than any of the upper limits set forth above, functionality of the dispersant composition as a dispersant is enhanced, which can further increase dispersion state stability over time of an obtained slurry composition and can further enhance rate characteristics and high-temperature storage characteristics of an obtained electrochemical device. Note that the volume-average particle diameter D50 of the polymer can be appropriately controlled through the chemical composition of the polymer, the production conditions of the polymer, and so forth. For example, the value of the volume-average particle diameter D50 can be reduced by reducing the proportional content of nitrile group-containing monomer units in the polymer, whereas the value of the volume-average particle diameter D50 can be increased by increasing the proportional content of nitrile group-containing monomer units in the polymer. The value of the volume-average particle diameter D50 can also be reduced by increasing the iodine value of the polymer (i.e., by increasing the proportion of carbon-carbon unsaturated bonds in repeating units forming the polymer). Furthermore, the value of the volume-average particle diameter D50 can be reduced by compounding a larger amount of an antioxidant in production of the polymer. Moreover, with regards to production conditions of the polymer, raising the drying temperature or hydrogenation reaction temperature of the polymer can increase the value of the volume-average particle diameter D50.

<<Peaks Detected in Particle Diameter Range of Not Less Than 5 μm and Not More Than 30 μm>>

It is necessary that upon measurement of the polymer by dynamic light scattering, one or more peaks are detected in a particle diameter range of not less than 5 μm and not more than 30 μm. Moreover, the particle diameter range in which the polymer has one or more peaks is preferably 7 μm or more, and is preferably 20 μm or less, and more preferably 17 μm or less. When the particle diameter range in which the polymer has one or more peaks is not less than any of the lower limits set forth above, rate characteristics of an obtained electrochemical device can be further enhanced. Moreover, when the particle diameter range in which the polymer has one or more peaks is not more than any of the upper limits set forth above, dispersion state stability over time of an obtained slurry composition can be further increased, and rate characteristics and high-temperature storage characteristics of an obtained electrochemical device can be further enhanced. As previously described, the one or more peaks detected in a particle diameter range of not less than 5 μm and not more than 30 μm are thought to indicate the size of clusters formed by a plurality of polymer molecules. The value of a particle diameter at which a peak is detected can be increased by, in the production conditions of the polymer, setting the drying temperature and the hydrogenation reaction temperature of the polymer as higher than specific temperatures, for example.

<<Value of Parameter (B/A)>>

When a value for a particle diameter corresponding to a largest peak among the one or more peaks that are detected in the particle diameter range of not less than 5 μm and not more than 30 μm upon measurement of the polymer by dynamic light scattering is taken to be (B), the value of a parameter (B/A) that is obtained by dividing the value (B) for the particle diameter by the value (A) for the volume-average particle diameter D50 is preferably 7 or more, and more preferably 25 or more, and is preferably 300 or less, and more preferably 200 or less. When the value of the parameter (B/A) is within any of the ranges set forth above, dispersion state stability over time of an obtained slurry composition can be further increased, and rate characteristics of an obtained electrochemical device can be further enhanced.

<<Iodine Value of Polymer>>

The iodine value of the polymer is preferably 1 mg/100 mg or more, and more preferably 3 mg/100 mg or more, and is preferably 60 mg/100 mg or less, more preferably 50 mg/100 mg or less, and even more preferably 40 mg/100 mg or less. When the iodine value of the polymer is not less than any of the lower limits set forth above, the content of carbon-carbon double bonds in the polymer, which can act as a starting point for side reactions, is sufficiently low, and high-temperature storage characteristics of an obtained electrochemical device can be further enhanced. When the iodine value of the polymer is not more than any of the upper limits set forth above, gaps of suitable size can be formed when an electrode is formed, and rate characteristics of an obtained electrochemical device can be further enhanced. The iodine value of the polymer can be controlled by altering hydrogenation conditions in production of the polymer, for example. Note that the iodine value of the polymer can be measured by a method described in the EXAMPLES section of the present specification.

<<Chemical Composition of Polymer>>

The polymer is required to include a nitrile group-containing monomer unit and an alkylene structural unit.

Examples of monomers that can be used to form a nitrile group-containing monomer unit include α,β-ethylenically unsaturated nitrile monomers. Specifically, examples of α,β-ethylenically unsaturated nitrile monomers that may be used include acrylonitrile; α-halogenoacrylonitriles such as α-chloroacrylonitrile and α-bromoacrylonitrile; and α-alkylacrylonitriles such as methacrylonitrile and α-ethylacrylonitrile. One of these α,β-ethylenically unsaturated nitrile monomers may be used individually, or two or more of these α,β-ethylenically unsaturated nitrile monomers may be used in combination. Of these α,β-ethylenically unsaturated nitrile monomers, acrylonitrile and methacrylonitrile are preferable from a viewpoint of increasing binding strength that can be displayed by the polymer, and acrylonitrile is more preferable. The proportional content of nitrile group-containing monomer units in the polymer when all repeating units are taken to be 100 mass % is preferably 10 mass % or more, and more preferably 15 mass % or more, and is preferably 60 mass % or less, more preferably 55 mass % or less, and even more preferably 50 mass % or less. When the proportional content of nitrile group-containing monomer units in the polymer is not less than any of the lower limits set forth above, dispersion state stability over time of an obtained slurry composition can be further increased, and high-temperature storage characteristics of an obtained electrochemical device can be further enhanced. When the proportional content of nitrile group-containing monomer units in the polymer is not more than any of the upper limits set forth above, dispersion state stability over time of a slurry composition can be further increased while also inhibiting excessive increase of swellability in electrolyte solution and deterioration of rate characteristics of an electrochemical device.

An alkylene structural unit included in the polymer is a repeating unit that is composed of only an alkylene structure represented by a general formula: $-C_nH_{2n}-$ (n is an integer of 2 or more). Although the alkylene structural unit may be linear or branched, the alkylene structural unit is preferably linear (i.e., is preferably a linear alkylene structural unit). Moreover, the carbon number of the alkylene structural unit is preferably 4 or more (i.e., n in the preceding general formula is preferably an integer of 4 or more).

No specific limitations are placed on the method by which the alkylene structural unit is introduced into the polymer. For example, method (1) or (2) described below may be used.

(1) A method in which a polymer is produced from a monomer composition containing a conjugated diene monomer and then the polymer is hydrogenated in order to convert a conjugated diene monomer unit to an alkylene structural unit (2) A method in which a polymer is produced from a monomer composition containing a 1-olefin monomer Of these methods, method (1) is preferable in terms of ease of production of the polymer.

The conjugated diene monomer may be a conjugated diene compound having a carbon number of 4 or more such as 1,3-butadiene, isoprene, 2,3-dimethyl-1,3-butadiene, 2-ethyl-1,3-butadiene, or 1,3-pentadiene, for example. Of these conjugated diene compounds, 1,3-butadiene is preferable. In other words, the alkylene structural unit is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene unit (i.e., the alkylene structural unit is more preferably a hydrogenated 1,3-butadiene unit).

The 1-olefin monomer may be ethylene, propylene, 1-butene, 1-hexene, or the like, for example.

One of these conjugated diene monomers or 1-olefin monomers may be used individually, or two or more of these conjugated diene monomers or 1-olefin monomers may be used in combination.

Selective hydrogenation of a conjugated diene monomer unit can be carried out by a commonly known method such as an oil-layer hydrogenation method or a water-layer hydrogenation method. Of these methods, it is preferable that hydrogenation is performed by oil-layer hydrogenation. Hydrogenation by oil-layer hydrogenation is described further below.

The proportional content of alkylene structural units in the polymer when all repeating units are taken to be 100 mass % is preferably 40 mass % or more, more preferably 45 mass % or more, and even more preferably 50 mass % or more, and is preferably 90 mass % or less, and more preferably 85 mass % or less. When the proportional content of alkylene structural units in the polymer is not less than any of the lower limits set forth above, dispersion state stability over time of an obtained slurry composition can be further increased while also inhibiting excessive increase of swelling in electrolyte solution and deterioration of rate characteristics of an electrochemical device. When the proportional content of alkylene structural units in the polymer is not more than any of the upper limits set forth above, dispersion state stability over time of an obtained slurry composition can be further increased, and high-temperature storage characteristics of an obtained electrochemical device can be further enhanced. Note that in a case in which the polymer is a polymer that is obtained according to method (1) described above, the total proportion constituted by alkylene structural units and conjugated diene monomer units in the polymer preferably satisfies any of the ranges set forth above.

Note that besides a nitrile group-containing monomer unit and an alkylene structural unit such as described above, the polymer may include other monomer units that are copolymerizable therewith. Examples of such monomer units include, but are not specifically limited to, a (meth)acrylic acid ester monomer unit, an aromatic vinyl monomer unit, and an acidic group-containing monomer unit. Note that in the present specification, "(meth)acryl" is used to indicate "acryl" or "methacryl". In a case in which the polymer includes repeating units other than nitrile group-containing monomer units and alkylene structural units, the upper limit for the content thereof is preferably 50 mass % or less, more preferably 40 mass % or less, and even more preferably 35 mass % or less when all repeating units are taken to be 100 mass %.

[(Meth)Acrylic Acid Ester Monomer Unit]

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, and 2-ethylhexyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, and 2-ethylhexyl methacrylate. One of these (meth)acrylic acid ester monomers may be used individually, or two or more of these (meth)acrylic acid ester monomers may be used in combination.

[Aromatic Vinyl Monomer Unit]

Examples of aromatic vinyl monomers that can form an aromatic vinyl monomer unit include styrene, $\alpha$-methylstyrene, vinyltoluene, and divinylbenzene. One of these aromatic vinyl monomers may be used individually, or two or more of these aromatic vinyl monomers may be used in combination.

[Acidic Group-Containing Monomer Unit]

Examples of acidic group-containing monomers that can form an acidic group-containing monomer unit include carboxy group-containing monomers, sulfo group-containing monomers, and phosphate group-containing monomers. One of these acidic group-containing monomers may be used individually, or two or more of these acidic group-containing monomers may be used in combination. Note that examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, $\alpha$-acetoxyacrylic acid, $\beta$-trans-aryloxyacrylic acid, and $\alpha$-chloro-$\beta$-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group through hydrolysis can also be used as a carboxy group-containing monomer.

One of these carboxy group-containing monomers may be used individually, or two or more of these carboxy group-containing monomers may be used in combination.

<<Production Method of Polymer>>

No specific limitations are placed on the method by which the polymer is produced. The polymerization method used in production of the polymer is not specifically limited and may be solution polymerization, suspension polymerization, bulk polymerization, emulsion polymerization, or the like. Of these methods, emulsion polymerization is preferable. Moreover, ionic polymerization, radical polymerization, living radical polymerization, or the like may be adopted as the polymerization reaction. Moreover, typically used emulsifiers, dispersants, polymerization initiators, molecular weight modifiers, and the like can be used in the polymerization, and the amount thereof can also be the same as typically used. In particular, it is preferable to use tert-dodecyl mercaptan as a molecular weight modifier. The additive amount of the molecular weight modifier is preferably not less than 0.1 parts by mass and not more than 2.0 parts by mass based on 100 parts by mass of monomers in a monomer composition used in the polymerization reaction. The polymerization temperature is preferably not lower than 0° C. and not higher than 50° C.

The polymerization conversion rate when the polymerization reaction is terminated is preferably more than 90%, and more preferably 92% or more, and is preferably 97% or less. Through the polymerization conversion rate being not less than any of the lower limits set forth above, formation of clusters can be facilitated, and the polymer contained in the presently disclosed dispersant composition can be efficiently produced.

A specific substituted phenol compound is preferably added to a dispersion liquid containing a polymerized product that is obtained through the polymerization reaction. This substituted phenol compound may be any substituted phenol compound that includes at least one phenolic hydroxy group and at least one alkyl group, but is preferably a substituted phenol compound that includes one or two phenolic hydroxy groups and that also includes at least one alkyl group at an ortho position, meta position, or para position of a phenolic hydroxy group. Moreover, a substituted phenol compound that includes a group other than an alkyl group at an ortho position, meta position, or para position of a phenolic hydroxy group may be used. Examples of such substituted phenol compounds include, but are not specifically limited to, various substituted phenol compounds represented by the following general formulae (1) and (2).

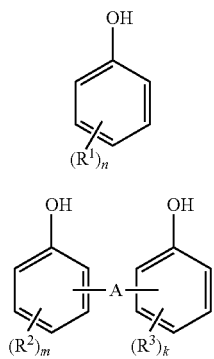

In general formula (1), each $R^1$ is independently an alkyl group having a carbon number of 1 to 7, an alkoxy group having a carbon number of 1 to 5, an amino group, an amino group substituted with an alkyl group having a carbon number of 1 to 4, or a nitrogen-containing heterocyclic group, and n is an integer of 1 to 5. Moreover, at least one $R^1$ in general formula (1) is an alkyl group having a carbon number of 1 to 7.

In general formula (2), each $R^2$ or $R^3$ is independently an alkyl group having a carbon number of 1 to 7, an alkoxy group having a carbon number of 1 to 5, an amino group, an amino group substituted with an alkyl group having a carbon number of 1 to 4, or a nitrogen-containing heterocyclic group, A is a chemical single bond or an alkylene group having a carbon number of 1 to 4, and m and k are each independently an integer of 1 to 4. Moreover, at least one $R^2$ in general formula (2) is an alkyl group having a carbon number of 1 to 7, and at least one $R^3$ in general formula (2) is an alkyl group having a carbon number of 1 to 7.

Of compounds represented by general formula (1), compounds including an alkyl group having a carbon number of 1 to 5 as $R^1$ at at least an ortho position or a para position of the phenolic hydroxy group are preferable, and compounds including an alkyl group having a carbon number of 1 to 5 at every one of the two ortho positions and the para position of the phenolic hydroxy group are particularly preferable in terms that the effects disclosed herein can be made more evident.

Likewise, of compounds represented by general formula (2), compounds represented by the following general formula (3) are preferable in terms that the effects disclosed herein can be made more evident. Moreover, of compounds represented by general formula (3), compounds including an alkyl group having a carbon number of 1 to 5 as $R^2$ and $R^3$ at at least an ortho position or a para position in the two phenolic hydroxy groups of the two aromatic rings are preferable, and compounds including an alkyl group having a carbon number of 1 to 5 at every ortho position and para position in the two phenolic hydroxy groups of the two aromatic rings are particularly preferable.

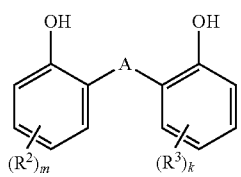

($R^2$, $R^3$, A, m, and k in general formula (3) are the same as in general formula (2).)

Specific examples of the substituted phenol compound include 2-isopropyl-5-methylphenol, 3-methyl-4-isopropylphenol, butylhydroxyanisole, 2-(2H-benzotriazol-2-yl)-4,6-di-tert-butylphenol, 2,6-di-tert-butyl-p-cresol, 2,6-di-tert-butyl-α-dimethylamino-p-cresol, a mixture of 2,6-di-tert-butylphenol, 2,4,6-tri-tert-butylphenol, and ortho-tert-butylphenol, mono(α-methylbenzyl)phenol, di(α-methylbenzyl)phenol, tri(α-methylbenzyl)phenol, a mixture of alkyl and aralkyl-substituted phenols, 2,2'-methylenebis(4-methyl-6-tert-butylphenol), 2,2'-methylenebis(4-methyl-6-cyclohexylphenol), 2,2'-methylenebis(4-ethyl-6-tert-butylphenol), alkylated bisphenol, 4,4'-methylenebis(2,6-di-tert-butylphenol), methylene bridged polyhydric alkylphenol, butylated p-cresol and dicyclopentadiene, polybutylated bisphenol A, 4,4'-thiobis(6-tert-butyl-3-methylphenol), 4,4'-butylidenebis(3-methyl-6-tert-butylphenol), 2,4-bis[(octylthio)methyl]-o-cresol, a hindered phenol, and a hindered bisphenol. Of these substituted phenol compounds, 2,6-di-tert-butyl-4-methylphenol (dibutylhydroxytoluene) and 2,2'-methylenebis(4-methyl-6-tert-butylphenol) are more preferable in terms that the effects disclosed herein can be further increased, with dibutylhydroxytoluene being more preferable.

The additive amount of the substituted phenol compound (i.e., the proportional content of the substituted phenol compound in the dispersant composition) is preferably 0.01 mass % or more, and more preferably 0.05 mass % or more based on the total mass of the polymer, and is preferably 0.2 mass % or less, and more preferably 0.15 mass % or less based on the total mass of the polymer. When the proportional content of the substituted phenol compound in the dispersant composition is within any of the ranges set forth above, dispersion state stability over time of an obtained slurry composition and rate characteristics and high-temperature storage characteristics of an obtained electrochemical device can be further enhanced. More specifically, when the proportional content of the substituted phenol compound is not less than any of the lower limits set forth above, excessive increase of the volume-average particle diameter D50 and the size of clusters of the polymer can be inhibited, and stability of the polymer can be increased. Moreover, when the proportional content of the substituted phenol compound is not more than any of the upper limits set forth above, the volume-average particle diameter D50 and the size of clusters of the polymer can be suitably increased, and dispersion state stability over time of an obtained slurry composition and rate characteristics of an obtained secondary battery can be further enhanced. Therefore, through the proportional content of the substituted phenol compound being within any of the ranges set forth above, it is possible to cause an effect of breaking up and dispersing a conductive material to be displayed through small-particle diameter polymer while also, on the other hand, causing an effect of dispersion stabilization of the conductive material through steric hinderance to be displayed by clusters, and thus maintaining a good balance of these effects.

In a case in which a dispersion liquid that contains a polymerized product including a conjugated diene monomer unit and a nitrile group-containing monomer unit is obtained by the method set forth above, the obtained dispersion liquid is then coagulated by salting-out through addition of calcium chloride or the like, is subjected to filtration, washing, drying, and the like, and is then dissolved in an organic solvent such as acetone. The drying is preferably performed under reduced pressure, and the drying temperature is preferably 70° C. or higher, and is preferably 150° C. or lower, and more preferably 130° C. or lower. Next, the pre-hydrogenation polymer that has been dissolved in the organic solvent is subjected to a hydrogenation reaction by oil-layer hydrogenation so as to obtain a hydrogenation reaction product. A post-hydrogenation polymer can then be obtained by separating a catalyst component from the obtained hydrogenation reaction product by filtration and removing the organic solvent that was used in the hydrogenation reaction. The presently disclosed dispersant composition can be obtained as the polymer in that form or as a solution having the polymer dissolved in a subsequently described solvent.

Note that the hydrogenation reaction by oil-layer hydrogenation can be performed using a commonly known selective hydrogenation catalyst such as a palladium-based catalyst or a rhodium-based catalyst. In particular, a palladium-based catalyst can suitably be used. Two or more of such catalysts may be used in combination. These catalysts are typically used in a mounted form on a support. The support may be silica, silica-alumina, alumina, diatomite, activated carbon, or the like. The used amount of the catalyst, as an amount in terms of metal, can be preferably 10 ppm to 5,000 ppm, and more preferably 100 ppm to 3,000 ppm based on 100 parts by mass of the pre-hydrogenation polymer that is the subject of hydrogenation. The used amount of the catalyst can be altered as appropriate in order to adjust the iodine value of the obtained polymer to a desired value.

The hydrogenation reaction temperature in the oil-layer hydrogenation is preferably 0° C. or higher, more preferably 10° C. or higher, even more preferably 50° C. or higher, and particularly preferably 70° C. or higher, and is preferably 200° C. or lower, more preferably 115° C. or lower, and even more preferably 105° C. or lower. The hydrogenation pressure in the oil-layer hydrogenation is preferably 0.1 MPa to 30 MPa, and more preferably 0.2 MPa to 20 MPa. The hydrogenation reaction time in the oil-layer hydrogenation is preferably 1 hour to 50 hours, and more preferably 2 hours to 25 hours.

The value for the volume-average particle diameter D50 of individual polymer molecules and the size of clusters can be controlled through a combination of the temperature (for example, the polymerization temperature during polymerization of the specific polymer contained in the presently disclosed dispersant composition, the drying temperature after polymerization, and the hydrogenation temperature) and the amount of the substituted phenol compound. For example, a higher temperature up until the polymer is produced, in terms of polymerization temperature, drying temperature after polymerization, hydrogenation temperature, and so forth, tends to promote formation of clusters, whereas compounding of a larger amount of the substituted phenol compound tends to suppress formation of clusters. Accordingly, the value for the volume-average particle diameter D50 of individual polymer molecules and the size of clusters can be controlled to within desired ranges through balancing of these conditions.

Examples of solvents that may be used with the polymer described above include alcohols such as methanol, ethanol, n-propanol, isopropanol, n-butanol, isobutanol, t-butanol, pentanol, hexanol, heptanol, octanol, nonanol, decanol, and amyl alcohol, ketones such as acetone, methyl ethyl ketone, and cyclohexanone, esters such as ethyl acetate and butyl acetate, ethers such as diethyl ether, dioxane, and tetrahydrofuran, amide polar organic solvents such as N,N-dimethylformamide and N-methyl-2-pyrrolidone (NMP), and aromatic hydrocarbons such as toluene, xylene, chlorobenzene, orthodichlorobenzene, and paradichlorobenzene. One of these solvents may be used individually, or two or more of these solvents may be used as a mixture. Of these solvents, NMP is preferable as a solvent used with the polymer described above. In a situation in which the polymer is dissolved in a solvent, the method by which the polymer is dissolved can be a known method that is typically used such as mixing using a di sper blade.

<Other Components>

Besides the components described above, the presently disclosed dispersant composition may contain components such as reinforcing materials, leveling agents, viscosity modifiers, and additives for electrolyte solution. These other components are not specifically limited so long as they do not affect battery reactions and may be selected from commonly known components such as those described in WO2012/115096A1. One of these components may be used individually, or two or more of these components may be used in combination in a freely selected ratio.

(Conductive Material Dispersion Liquid for Electrochemical Device)

A feature of the presently disclosed conductive material dispersion liquid for an electrochemical device (hereinafter, also referred to simply as a "conductive material dispersion liquid") is that it contains a conductive material, a solvent, and the presently disclosed dispersant composition set forth above. The presently disclosed conductive material dispersion liquid can produce a slurry composition having excellent dispersion state stability over time and can enhance rate characteristics and high-temperature storage characteristics of an obtained electrochemical device as a result of being obtained by adding the presently disclosed dispersant composition to a conductive material.

<Conductive Material>

The conductive material is a material for ensuring electrical contact among an electrode active material. Examples of conductive materials that can be used include conductive carbon materials such as carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single-layer or multi-layer graphene, and carbon non-woven fabric sheet obtained by pyrolyzing non-woven fabric made of polymer fiber; and fibers and foils of various metals. One of these conductive materials may be used individually, or two or more of these conductive materials may be used in combination. In particular, it is preferable that the conductive material includes carbon nanotubes (hereinafter, also denoted as "CNTs"). In general, CNTs readily aggregate and tend to be difficult to disperse. However, the presently disclosed dispersant composition enables good dispersion of even a conductive material that includes CNTs.

The BET specific surface area of CNTs serving as the conductive material is preferably 100 $m^2/g$ or more, more preferably 150 $m^2/g$ or more, even more preferably 200 $m^2/g$ or more, and particularly preferably 250 $m^2/g$ or more, and is preferably 1,200 $m^2/g$ or less, more preferably 1,000 $m^2/g$ or less, and even more preferably 500 $m^2/g$ or less. Note that the "BET specific surface area" of the CNTs refers to the nitrogen adsorption specific surface area measured by the BET method and can be measured in accordance with ASTM D3037-81.

<Ratio of Polymer and Conductive Material in Conductive Material Dispersion Liquid>

With regards to the content ratio of the conductive material and the previously described polymer in the conductive material dispersion liquid, the polymer is preferably 5 parts by mass or more, and more preferably 10 parts by mass or more when the content of the conductive material is taken to be 100 parts by mass, and is preferably 100 parts by mass or less, and more preferably 50 parts by mass or less when the content of the conductive material is taken to be 100 parts by mass.

<Other Components>

No specific limitations are placed on solvents and other components that can be compounded in the conductive material dispersion liquid, and any of the same solvents as can be used in combination with the presently disclosed dispersant composition and any of the same other components as can be compounded in the dispersant composition may be used. Moreover, one of such solvents or other components may be used individually, or two or more of such solvents or other components may be used in combination in a freely selected ratio.

<Viscosity of Conductive Material Dispersion Liquid>

The viscosity of the conductive material dispersion liquid is preferably 16 Pa·s or less, and more preferably 4 Pa·s or less, and is preferably 0.05 Pa·s or more, and more preferably 0.2 Pa·s or more. When the value of the viscosity of the conductive material dispersion liquid is within any of the ranges set forth above, this means that the conductive material is dispersed well in the conductive material dispersion liquid (i.e., that the dispersant composition functions well as a dispersant). Note that the viscosity of the conductive material dispersion liquid can be measured by a method described in the EXAMPLES section.

<Production of Conductive Material Dispersion Liquid>

The presently disclosed conductive material dispersion liquid can be produced by mixing the above-described dispersant composition, conductive material, solvent, and other optional components by a known method. Specifically, the conductive material dispersion liquid can be produced by mixing the above-described components using a mixer such as a disper blade, a ball mill, a sand mill, a bead mill, a pigment disperser, a grinding machine, an ultrasonic disperser, a homogenizer, a planetary mixer, or a FILMIX. Note that the solid content concentration of the conductive material dispersion liquid may, for example, be not less than 1 mass % and not more than 25 mass %.

(Slurry Composition for Electrochemical Device Electrode)

The presently disclosed slurry composition for an electrochemical device electrode contains an electrode active material, a conductive material, and the dispersant composition set forth above, and optionally further contains other components. In other words, the presently disclosed slurry composition contains an electrode active material, a conductive material, and the previously described polymer, and optionally further contains other components. The presently disclosed slurry composition has excellent dispersion state stability over time as a result of containing the dispersant composition set forth above. Moreover, the presently disclosed slurry composition can cause an electrochemical device to display excellent rate characteristics and high-temperature storage characteristics.

Although the following describes, as one example, a case in which the electrochemical device is a lithium ion secondary battery and in which the presently disclosed slurry composition for an electrochemical device is a slurry composition for a lithium ion secondary battery positive electrode, the presently disclosed slurry composition for an electrochemical device is not limited to the following example.

<Electrode Active Material>

The electrode active material is a material that gives and receives electrons in an electrode of a secondary battery. A material that can occlude and release lithium is normally used as a positive electrode active material for a lithium ion secondary battery.

Specifically, the positive electrode active material for a lithium ion secondary battery may be a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn (Li(Co Mn Ni)$O_2$; $LiNi_{0.8}Co_{0.1}Mn_{0.1}O_2$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, a lithium-rich spinel compound represented by $Li_{1+x}Mn_{2-x}O_4$ (0<x<2), $Li[Ni_{0.17}Li_{0.2}Co_{0.07}Mn_{0.56}]O_2$, or $LiNi_{0.5}Mn_{1.5}O_4$ without any specific limitations.

The particle diameter of the positive electrode active material is not specifically limited and may be the same as that of a conventionally used positive electrode active material.

<Conductive Material>

The conductive material can be any of the conductive materials that can be compounded in the presently disclosed conductive material dispersion liquid set forth above. Note that the amount of the conductive material in the slurry composition is preferably 0.1 parts by mass or more when the amount of the electrode active material is taken to be 100 parts by mass, and is preferably 5 parts by mass or less, and more preferably 2 parts by mass or less when the amount of the electrode active material is taken to be 100 parts by mass. When the amount of the conductive material in the slurry composition is within any of the ranges set forth above, rate characteristics of an obtained electrochemical device can be further enhanced. Moreover, compounding of a smaller amount of the conductive material in the slurry composition while keeping within any of the ranges set forth above is preferable from a viewpoint of increasing the capacity of an electrochemical device.

<Dispersant Composition>

The presently disclosed dispersant composition set forth above is used as the dispersant composition. The proportional content of the previously described specific polymer in the slurry composition is a proportional content satisfying any of the proportions described in the "Ratio of polymer and conductive material in conductive material dispersion liquid" section.

<Binder>

A conventionally used binder for a positive electrode such as polyvinylidene fluoride can be used as a binder without any specific limitations. The proportional content of the binder in the slurry composition may, for example, be not less than 0.1 mass % and not more than 5 mass % when all solid content in the slurry composition is taken to be 100 mass %.

<Other Components>

Examples of other components that can be compounded in the slurry composition include, but are not specifically limited to, the same other components as can be compounded in the presently disclosed dispersant composition. One other component may be used individually, or two or more other components may be used in combination in a freely selected ratio.

(Production Method of Slurry Composition for Electrochemical Device Electrode)

A feature of a production method of the slurry composition set forth above is that it includes a first step of mixing the above-described polymer, conductive material, and solvent to produce a conductive material dispersion liquid and a second step of mixing the conductive material dispersion liquid obtained in the first step and the electrode active material. The presently disclosed method of producing a slurry composition enables efficient production of the presently disclosed slurry composition.

In the first step, the above-described polymer, conductive material, and solvent are mixed by a known method. The mixing can be performed using any of the various mixers given as examples in the "Production of conductive material dispersion liquid" section. Note that the polymer, conductive material, and solvent can be those that were previously described. Also note that the conductive material dispersion liquid produced in the first step may be in the form of a paste.

In the second step, the conductive material dispersion liquid produced in the first step and the electrode active material are mixed. Further solvent may be added at this time as necessary. The solvent that is used can be the same as that used in the first step. The additive amount of the solvent can be adjusted as appropriate such that the viscosity of the obtained slurry composition is a desired viscosity. Moreover, the mixing can be performed using any of the various mixers given as examples in the "Production of conductive material dispersion liquid" section.

(Electrode for Electrochemical Device)

The presently disclosed electrode for an electrochemical device includes a current collector and an electrode mixed material layer formed on the current collector, wherein the electrode mixed material layer is formed using the slurry composition set forth above. In other words, the electrode mixed material layer contains at least an electrode active material, a conductive material, and the previously described polymer, and optionally contains other components. It should be noted that components contained in the electrode mixed material layer are components that are contained in the previously described slurry composition. Furthermore, the preferred ratio of these components in the electrode mixed material layer is the same as the preferred ratio of these components in the slurry composition. Also note that in the electrode mixed material layer, (individual) polymer molecules are preferably present covering the surface of the conductive material, whereas polymer clusters are preferably interposed between the conductive material. When an electrochemical device is formed, the (individual) polymer molecules covering the conductive material can inhibit the occurrence of side reactions due to the conductive material in the electrochemical device, whereas the clusters interposed between the conductive material can increase mobility of ions that contribute to an electrochemical reaction in the electrochemical device.

The presently disclosed electrode for an electrochemical device can form an electrochemical device having excellent rate characteristics and high-temperature storage characteristics as a result of being formed using a slurry composition that contains the presently disclosed dispersant composition for an electrochemical device.

<Production Method of Electrode>

The presently disclosed electrode for an electrochemical device is produced, for example, through a step of applying the slurry composition set forth above onto the current collector (application step) and a step of drying the slurry composition that has been applied onto the current collector so as to form an electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. One of these materials may be used individually, or two or more of these materials may be used in combination in a freely selected ratio.

[Drying Step]

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, an electrode mixed material layer can be formed on the current collector to thereby obtain an electrode for an electrochemical device that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

(Electrochemical Device)

The presently disclosed electrochemical device includes the presently disclosed electrode for an electrochemical device. Moreover, the presently disclosed electrochemical device has excellent battery characteristics such as rate characteristics and high-temperature storage characteristics as a result of including the presently disclosed electrode for an electrochemical device. The presently disclosed electrochemical device may, for example, be an electric double-layer capacitor or a non-aqueous secondary battery such as a lithium ion secondary battery. In a case in which the presently disclosed electrochemical device is a non-aqueous secondary battery such as a lithium ion secondary battery, the non-aqueous secondary battery includes a positive electrode, a negative electrode, an electrolyte solution, and a separator, and the presently disclosed electrode for an electrochemical device is used as at least one of the positive electrode and the negative electrode. The non-aqueous secondary battery that is an example of the presently disclosed electrochemical device is preferably a non-aqueous secondary battery in which the presently disclosed electrode for an electrochemical device is used as a positive electrode. Although the following describes, as one example, a case in which the electrochemical device is a lithium ion secondary battery, the presently disclosed electrochemical device is not limited to the following example.

<Electrode>

Examples of electrodes other than the electrode for an electrochemical device set forth above that can be used in a lithium ion secondary battery that is an example of the presently disclosed electrochemical device include known electrodes used in production of lithium ion secondary batteries without any specific limitations. Specifically, an electrode obtained by forming an electrode mixed material layer on a current collector by a known production method can be used as an electrode other than the electrode for an electrochemical device set forth above.

<Electrolyte Solution>

The electrolyte solution is normally an organic electrolyte solution in which a supporting electrolyte is dissolved in an organic solvent. The supporting electrolyte of the lithium ion secondary battery may, for example, be a lithium salt. Examples of lithium salts that may be used include $LiPF_6$, $LiAsF_6$, $LiBF_4$, $LiSbF_6$, $LiAlCl_4$, $LiCO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region, and a mixture of ethylene carbonate and diethyl carbonate is more preferable.

The concentration of the electrolyte in the electrolyte solution may be adjusted as appropriate. Moreover, known additives such as vinylene carbonate, for example, can be added to the electrolyte solution.

<Separator>

Examples of the separator include, but are not specifically limited to, separators described in JP2012-204303A. Of these separators, a microporous membrane made of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the volumetric capacity.

<Production Method of Electrochemical Device>

The lithium ion secondary battery that is an example of the electrochemical device can be produced by, for example, stacking the positive electrode and the negative electrode with the separator in-between, performing rolling, folding, or the like of the resultant laminate in accordance with the battery shape, as necessary, in order to place the laminate in a battery container, injecting the electrolyte solution into the battery container, and sealing the battery container. In order to prevent pressure increase inside the lithium ion secondary battery and occurrence of overcharging or overdischarging, an overcurrent preventing device such as a fuse or a PTC device, an expanded metal, or a lead plate may be provided as necessary. The shape of the lithium ion secondary battery may be a coin type, a button type, a sheet type, a cylinder type, a prismatic type, a flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer. Furthermore, in the case of a polymer that is a hydrogenated polymer obtained through hydrogenation of a polymerized product including conjugated diene monomer units, the total proportional content of non-hydrogenated conjugated diene monomer units and alkylene structural units that are hydrogenated conjugated diene monomer units in the hydrogenated polymer is the same as the ratio (charging ratio) of a conjugated diene monomer among all monomers used in polymerization of the polymerized product.

Various measurements and evaluations in the examples and comparative examples were performed as follows.

<Dynamic Light Scattering Measurement of Polymer>

An NMP solution of a polymer produced in each example or comparative example was adjusted to a solid content concentration of 0.3 mass % and was then stirred at 60 rpm for at least 30 minutes using a shaking machine until dissolution was confirmed in order to obtain a polymer NMP solution as a measurement subject. A particle diameter distribution by volume was measured for the obtained measurement subject at 25° C. using a dynamic light scattering measurement device (ELSZ-2000S produced by Otsuka Electronics Co., Ltd.). In the obtained particle diameter distribution (vertical axis: scattering intensity; horizontal axis: particle diameter), the particle diameter at which cumulative intensity calculated from the small diameter end of the distribution reached 50% of the overall intensity was taken to be a value (A) for volume-average particle diameter D50.

Moreover, a "peak" in this particle diameter distribution was defined based on the height of the largest peak in the particle diameter distribution as a peak having a height equivalent to 5% or more of the height of the largest peak. Furthermore, a value for a particle diameter corresponding to a largest peak among one or more peaks in a particle diameter range of not less than 5 and not more than 30 μm was defined as (B).

The values (A) and (B) obtained in this manner were used to calculate a value for B/A.

Note that in measurement of the particle diameter distribution, the permittivity of NMP was set as 32.2, the viscosity was set as 1.89 cP, and the refractive index was set as 1.4670.

<Iodine Value of Polymer>

Vacuum drying of 100 g of a polymer produced in each example or comparative example (polymer prior to dissolution in NMP) was performed at a temperature of 60° C. for 12 hours. The iodine value (mg/100 mg) of the obtained dry polymer was then measured in accordance with JIS K6235 (2006).

<Viscosity of Conductive Material Dispersion Liquid>

The viscosity of a conductive material dispersion liquid obtained in each example or comparative example was measured for 120 seconds at a temperature of 25° C. and a shear rate of 10 (1/s) using a rheometer (MCR302 produced by Anton Paar), and an average value was calculated for viscosity measurement values from 61 seconds to 120 seconds. A lower obtained viscosity value indicates better dispersion of a conductive material in the conductive material dispersion liquid (i.e., better functionality of a dispersant composition as a dispersant).

<Stability Over Time of Slurry Composition>

For a slurry composition produced in each example or comparative example, a value for viscosity 1 hour after production and a value for viscosity 2 weeks after production were each measured. These viscosities were measured in accordance with JIS Z8803:1991 under conditions of 25° C. and 60 rpm using a B-type viscometer. The proportional increase of the value for viscosity 2 weeks after production relative to the value for viscosity 1 hour after production was determined, and a viscosity change rate V (%) was calculated. A smaller value for the viscosity change rate V (%) indicates that the slurry composition has a lower tendency to thicken over time (i.e., has better dispersion state stability over time). By using a slurry composition having excellent dispersion state stability over time, it is possible to produce a uniform positive electrode, to increase initial efficiency of an electrochemical device including this positive electrode, and to reduce resistance.

A: V of less than 30%
B: V of not less than 30% and less than 70%
C: V of not less than 70% and less than 150%
D: V of 150% or more <Rate Characteristics>

A lithium ion secondary battery produced as an electrochemical device in each example or comparative example was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, the lithium ion secondary battery was CC-CV charged with a 0.2 C constant current (upper limit cell voltage 4.20 V) and was then CC discharged to a cell voltage of 3.00 V with a 0.2 C constant current. This charging and discharging at 0.2 C was repeated three times.

Next, 0.2 C constant-current charging and discharging was performed between cell voltages of 4.20 V and 3.00 V in an environment having a temperature of 25° C., and the discharge capacity at that time was defined as C0. Thereafter, the lithium ion secondary battery was CC-CV changed with a 0.2 C constant current in the same manner, was then CC discharged to 3.00 V with a 3.0 C constant current in an environment having a temperature of 25° C., and the discharge capacity at that time was defined as C1. A ratio (percentage; capacity maintenance rate) of the discharge capacity (C1) at 3.0 C relative to the discharge capacity (C0) at 0.2 C, expressed by (C1/C0)×100(%), was determined as a rate characteristic and was evaluated by the following standard. A larger value for the capacity maintenance rate indicates less reduction of discharge capacity at high current and lower internal resistance (i.e., better rate characteristics).

A: Capacity maintenance rate of 70% or more
B: Capacity maintenance rate of not less than 65% and less than 70%
C: Capacity maintenance rate of not less than 55% and less than 65%
D: Capacity maintenance rate of less than 55%

<High-Temperature Storage Characteristics>

A lithium ion secondary battery produced as an electrochemical device in each example or comparative example was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, the lithium ion secondary battery was CC-CV charged with a 0.2 C constant current (upper limit cell voltage 4.20 V) and was then CC discharged to a cell voltage of 3.00 V with a 0.2 C constant current. This charging and discharging at 0.2 C was repeated three times. The discharge capacity of the $3^{rd}$ cycle at 0.2 C was taken to be the initial capacity Cx. CC-CV charging was subsequently performed with a 0.2 C constant current (upper limit cell voltage 4.20 V). Next, the lithium ion secondary battery was stored for 4 weeks inside an inert oven in which the inside of a treatment chamber had been set to a nitrogen atmosphere of 60° C. Thereafter, the lithium ion secondary battery was discharged to a cell voltage of 3.00 V by a 0.2 C constant-current method, and the discharge capacity at that time was taken to be Cy.

A high-temperature capacity maintenance rate expressed by (Cy/Cx)×100(%) was determined and was evaluated by the following standard. A larger value for this high-temperature capacity maintenance rate indicates that there is less degradation of the battery during high-temperature storage (i.e., better high-temperature storage characteristics).

A: High-temperature capacity maintenance rate of 80% or more
B: High-temperature capacity maintenance rate of not less than 75% and less than 80%
C: High-temperature capacity maintenance rate of not less than 70% and less than 75%
D: High-temperature capacity maintenance rate of less than 70%

Example 1

A lithium ion secondary battery including a presently disclosed positive electrode for an electrochemical device was produced as one example of the presently disclosed electrochemical device. The following describes each step in detail.

<Production of Dispersant Composition>

A reactor having an internal capacity of 10 L was charged with 100 parts of deionized water, 35 parts of acrylonitrile as a nitrile group-containing monomer, and 65 parts of 1,3-butadiene as a conjugated diene monomer, and then 2 parts of potassium oleate as an emulsifier, 0.1 parts of potassium phosphate as a stabilizer, and 0.8 parts of tert-dodecyl mercaptan (TDM) as a molecular weight modifier were further added, and emulsion polymerization was performed at 30° C. in the presence of 0.35 parts of potassium persulfate as a polymerization initiator so as to copolymerize the butadiene and acrylonitrile.

At the point at which the polymerization conversion rate reached 95%, 0.2 parts of hydroxylamine sulfate was added per 100 parts of monomer to terminate polymerization. Next, heating was performed, steam distillation was performed at approximately 90° C. under reduced pressure to recover residual monomer, and then 0.1 parts of dibutylhydroxytoluene (BHT) was added as an antioxidant to yield a water dispersion of a polymerized product.

Next, a 25 mass % aqueous solution of calcium chloride was added under stirring such that the amount of calcium chloride was 3 parts relative to 100 parts of polymerized product solid content in the obtained water dispersion, and the polymerized product in the water dispersion was caused to coagulate. Thereafter, the polymerized product was separated by filtration, 50 equivalents of deionized water relative to the obtained polymerized product was passed to perform water washing, and then drying was performed at 90° C. under reduced pressure to yield a pre-hydrogenation polymer.

Next, the pre-hydrogenation polymer was hydrogenated by adopting oil-layer hydrogenation as the method of hydrogenation. The pre-hydrogenation polymer was dissolved in acetone with a concentration of 12% to obtain an acetone solution of the pre-hydrogenation polymer that was a subject for hydrogenation. This acetone solution was loaded into an autoclave, 500 mass ppm of a palladium/silica catalyst (amount in terms of palladium) was added relative to 100 mass % of the pre-hydrogenation polymer (hydrogenation subject), and then a hydrogenation reaction was performed at 90° C. and a hydrogen pressure of 3.0 MPa for 6 hours to yield a hydrogenation reaction product. Once the hydrogenation reaction had ended, the palladium/silica catalyst was filtered off, and acetone serving as a solvent was removed under reduced pressure to yield a target polymer. The obtained polymer was confirmed to include a nitrile group-containing monomer unit and an alkylene structural unit upon analysis of the polymer by $^1$H-NMR. Moreover, when an acetone solution in which the polymer was dissolved was analyzed by gas chromatography, BHT, which is a substituted phenol compound, was confirmed to be included in an amount of 0.01 mass % or more based on the total mass of the polymer.

A specific amount of the obtained polymer was dissolved in NMP to obtain an NMP solution in which the polymer was dissolved in NMP with a solid content concentration of 8%.

Note that a polymer was confirmed to include a nitrile group-containing monomer unit and an alkylene structural unit in the same manner in Examples 2 to 10 and Comparative Examples 1 to 3 that are described further below. Moreover, BHT, which is a substituted phenol compound, was confirmed to be included in an amount of 0.01 mass % or more based on the total mass of the polymer in each of Examples 2 to 10.

<Production of Conductive Material Dispersion Liquid>

After adding 5 parts of multi-walled carbon nanotubes (BET specific surface area: 250 m$^2$/g) as a conductive material, 12.5 parts (equivalent to 1 part as solid content) of the 8% NMP solution of the polymer obtained as described above, and 82.5 parts of NMP as an organic solvent into a mixing vessel, these materials were stirred (3,000 rpm, 10 minutes) using a disper blade. The obtained mixture was then mixed at a circumferential speed of 8 m/s for 1 hour using a bead mill (LMZ015 produced by Ashizawa Finetech Ltd.) in which zirconia beads of 1 mm in diameter were used to thereby produce a conductive material dispersion liquid.

The viscosity of the produced conductive material dispersion liquid, measured as previously described, was 3.8 Pa·s.

<Production of Slurry Composition for Electrochemical Device Positive Electrode>

A slurry for a positive electrode was produced by adding 100 parts of a ternary active material having a layered structure (LiNi$_{0.8}$Co$_{0.1}$Mn$_{0.1}$O$_2$) (average particle diameter: 10 μm) as a positive electrode active material, 1.1 parts of polyvinylidene fluoride (PVdF) as a binder, 1.0 parts (in terms of solid content) of the conductive material dispersion liquid, and NMP into a vessel and mixing (60 rpm, 30 minutes) these materials using a planetary mixer. Note that the additive amount of NMP was adjusted such that the viscosity of the obtained slurry composition for a positive electrode was within a range of 4,000 mPa·s to 5,000 mPa·s. The viscosity of the slurry composition for a positive electrode was measured in accordance with JIS Z8803:1991 by a B-type viscometer. During this measurement, the measurement temperature was 25° C. and the rotation speed was 60 rpm.

The obtained slurry composition for a positive electrode was evaluated as previously described.

<Production of Positive Electrode>

Aluminum foil of 20 μm in thickness was prepared as a current collector. The slurry composition for a positive electrode was applied onto both sides of the aluminum foil by a comma coater such as to have a coating weight after drying of 20 mg/cm² at each side, was dried at 90° C. for 20 minutes and at 120° C. for 20 minutes, and was then heat treated at 60° C. for 10 hours to obtain a positive electrode web. This positive electrode web was rolled by roll pressing to produce a sheet-shaped positive electrode including a positive electrode mixed material layer of 3.2 g/cm³ in density and aluminum foil. The thickness of the sheet-shaped positive electrode was 70 μm. This sheet-shaped positive electrode was cut to 4.8 cm in width and 50 cm in length to obtain a positive electrode for a lithium ion secondary battery.

<Production of Negative Electrode>

A 5 MPa pressure-resistant vessel equipped with a stirrer was charged with 33 parts of 1,3-butadiene as an aliphatic conjugated diene monomer, 3.5 parts of itaconic acid as a carboxy group-containing monomer, 63.5 parts of styrene as an aromatic vinyl monomer, 0.4 parts of sodium dodecylbenzenesulfonate as an emulsifier, 150 parts of deionized water, and 0.5 parts of potassium persulfate as a polymerization initiator. These materials were thoroughly stirred and were then heated to 50° C. to initiate polymerization. At the point at which the polymerization conversion rate reached 96%, cooling was performed to quench the polymerization reaction and yield a mixture containing a particulate binder (styrene-butadiene copolymer). The mixture was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing a binder for a negative electrode.

Next, 48.75 parts of artificial graphite and 48.75 parts of natural graphite as negative electrode active materials and 1 part of carboxymethyl cellulose as a thickener were loaded into a planetary mixer. These materials were diluted to a solid content concentration of 60% with deionized water and were subsequently kneaded at a rotation speed of 45 rpm for 60 minutes. Thereafter, 1.5 parts in terms of solid content of the water dispersion containing the binder for a negative electrode obtained as described above was added and was kneaded therewith at a rotation speed of 40 rpm for 40 minutes. Deionized water was added to adjust the viscosity to 3,000±500 mPa·s (measured by B-type viscometer at 25° C. and 60 rpm) and thereby produce a slurry composition for a negative electrode mixed material layer.

Next, copper foil of 15 μm in thickness was prepared as a current collector. The slurry composition for a negative electrode mixed material layer was applied onto both sides of the copper foil such as to have a coating weight after drying of 10 mg/cm² at each side and was dried at 60° C. for 20 minutes and at 120° C. for 20 minutes. Thereafter, 2 hours of heat treatment was performed at 150° C. to obtain a negative electrode web. This negative electrode web was rolled by roll pressing to produce a sheet-shaped negative electrode including a negative electrode mixed material layer of 1.6 g/cm³ in density and copper foil. The sheet-shaped negative electrode was cut to 5.0 cm in width and 52 cm in length to obtain a negative electrode for a lithium ion secondary battery.

<Production of Electrochemical Device (Lithium Ion Secondary Battery)>

The produced positive electrode for a lithium ion secondary battery and negative electrode for a lithium ion secondary battery were wound up with the electrode mixed material layers thereof facing each other and with a separator (microporous membrane made of polyethylene) of 15 μm in thickness in-between using a core of 20 mm in diameter so as to obtain a roll. The obtained roll was compressed to a thickness of 4.5 mm from one direction at a rate of 10 mm/s. Note that the compressed roll had an elliptical shape in plan view, and the ratio of the major axis and the minor axis (major axis/minor axis) was 7.7.

In addition, a $LiPF_6$ solution of 1.0 M in concentration (solvent: mixed solvent of ethylene carbonate (EC)/diethyl carbonate (DEC)=3/7 (volume ratio); additive: containing 2 volume % (solvent ratio) of vinylene carbonate) was prepared as an electrolyte solution.

The compressed roll was subsequently enclosed in a laminate case made of aluminum together with 3.2 g of the non-aqueous electrolyte solution. A nickel lead was connected to a specific position on the negative electrode, an aluminum lead was connected to a specific position on the positive electrode, and then an opening of the case was heat sealed to obtain a lithium ion secondary battery. This lithium ion secondary battery had a pouch shape of a specific size capable of accommodating the roll. The nominal capacity of the battery was 700 mAh.

Various evaluations of the obtained lithium ion secondary battery were performed as previously described.

Examples 2 to 4

Various operations and evaluations were performed in the same way as in Example 1 with the exception that the amount of antioxidant or the amounts of monomers used in production of the dispersant composition were changed as indicated in Table 1 so as to obtain a polymer satisfying a value (A) for volume-average particle diameter D50 and a value (B) for a specific particle diameter indicated in Table 1. The results are shown in Table 1. The viscosities of conductive material dispersion liquids produced in these examples, measured as previously described, were 3.9 Pa·s in Example 2, 3.6 Pa·s in Example 3, and 4.8 Pa·s in Example 4.

Example 5

Various operations and evaluations were performed in the same way as in Example 1 with the exception that the hydrogenation reaction conditions in production of the dispersant composition (specifically, the amount of catalyst and the hydrogenation reaction time) were changed such that the iodine value of the obtained polymer changed to 55 mg/100 mg. The results are shown in Table 1. The viscosity of the conductive material dispersion liquid produced in this example, measured as previously described, was 4.9 Pa·s.

Example 6

Various operations and evaluations were performed in the same way as in Example 1 with the exception that in production of the dispersant composition, the drying temperature when obtaining a pre-hydrogenation polymer was changed to 110° C. and the hydrogenation reaction temperature was changed to 110° C. The results are shown in Table 1. The viscosity of the conductive material dispersion liquid produced in this example, measured as previously described, was 5 Pa·s.

Example 7

Various operations and evaluations were performed in the same way as in Example 1 with the exception that in production of the dispersant composition, the amount of TDM used as a molecular weight modifier was changed to 0.5 parts, the drying temperature when obtaining a pre-hydrogenation polymer was changed to 110° C., and the hydrogenation reaction temperature was changed to 110° C. The results are shown in Table 1. The viscosity of the conductive material dispersion liquid produced in this example, measured as previously described, was 16 Pa·s.

Example 8

Various operations and evaluations were performed in the same way as in Example 1 with the exception that the amount of TDM used as a molecular weight modifier in production of the dispersant composition was changed to 1.5 parts. The results are shown in Table 1. The viscosity of the conductive material dispersion liquid produced in this example, measured as previously described, was 3.1 Pa·s.

Example 9

Various operations and evaluations were performed in the same way as in Example 1 with the exception that in production of the dispersant composition, the amount of TDM used as a molecular weight modifier was changed to 1.5 parts, the drying temperature when obtaining a pre-hydrogenation polymer was changed to 120° C., and the hydrogenation reaction temperature was changed to 120° C. The results are shown in Table 1. The viscosity of the conductive material dispersion liquid produced in this example, measured as previously described, was 4.2 Pa·s.

Example 10

Various operations and evaluations were performed in the same way as in Example 1 with the exception that a composition produced as described below was used as the slurry composition for a positive electrode.
<Production of Slurry Composition for Electrochemical Device Positive Electrode>

A slurry composition for a positive electrode was produced by adding together 100 parts of $Li(Ni_{0.8}Co_{0.1}Mn_{0.1})O$ as a positive electrode active material satisfying a specific chemical composition, 3.1 parts of acetylene black (Li-435 produced by Denka Company Limited; BET specific surface area: 133 m$^2$/g) as a conductive material, 0.167 parts of the polymer produced in Example 1 as a dispersant, 1.1 parts in terms of solid content of polyvinylidene fluoride (PVdF) as a binder, and NMP as an organic solvent and stirring (60 rpm, 30 minutes) these materials using a planetary mixer. Note that the additive amount of NMP was adjusted such that the viscosity of the obtained slurry composition for a positive electrode (measured in accordance with JIS Z8803: 1991 by single cylinder rotary viscometer; temperature: 25° C.; rotation speed: 60 rpm) was within a range of 3,500 mPa·s to 4,500 mPa·s.

Comparative Example 1

Various operations and evaluations were performed in the same way as in Example 1 with the exception that a dispersant composition containing a hydrogenated polymer produced as described below was used instead of the specific dispersant composition. The results are shown in Table 1. The viscosity of the conductive material dispersion liquid produced in this example, measured as previously described, was at least 50 Pa·s (exceeding device limit of detection).

Moreover, a "peak" of a specific size was not detected in a particle diameter range of not less than 5 μm and not more than 30 μm in a particle diameter distribution.
<Production of Dispersant Composition>

In a metal bottle, 0.2 parts of sodium carbonate was dissolved in 200 parts of deionized water. Next, 2.5 parts of potassium caprate (soap of a fatty acid having a carbon number of 10) was added to the metal bottle as an emulsifier. An aqueous solution containing 1.0 parts of a naphthalenesulfonic acid-formaldehyde polycondensate was further added as a dispersant. Thereafter, 35 parts of acrylonitrile as a nitrile group-containing monomer and 0.8 parts of t-dodecyl mercaptan as a molecular weight modifier were added to the metal bottle in this order. Gas inside the metal bottle was purged three times with nitrogen and then 65 parts of 1,3-butadiene was added as a conjugated diene monomer. The metal bottle was maintained at 5° C. while adding a redox polymerization initiator that was a combination of 0.1 parts of cumene hydroperoxide, 0.01 parts of ethylenediaminetetraacetic acid iron monosodium salt hydrate, 0.03 parts of sodium hydroxymethanesulfinate dihydrate, and 0.02 parts of EDTA·4Na·4H$_2$O. The temperature was then maintained at 5° C. for 16 hours while carrying out a polymerization reaction. Once the degree of polymerization reached 90%, the polymerization reaction was terminated through addition of 0.1 parts of hydroxylamine sulfate and 0.03 parts of diethylhydroxylamine as polymerization inhibitors. Residual monomer was removed using a rotary evaporator with a water temperature of 60° C. to yield a latex of a polymer including a conjugated diene monomer unit and a nitrile group-containing monomer unit. The polymer concentration at this time was 25 mass %.

A portion of the obtained latex was added to magnesium sulfate aqueous solution of an amount of 12 mass % relative to polymer solid content and was stirred therewith to coagulate the latex. Thereafter, filtration was performed with washing using water to obtain coagulated material that was then vacuum dried at a temperature of 60° C. for 12 hours to yield a nitrile rubber as a polymer.

Next, 9 parts of the obtained polymer was dissolved in 141 parts of monochlorobenzene and was loaded into a reactor. The reactor was heated to 80° C. and then 2 L of a monochlorobenzene solution containing bis(tricyclohexylphosphine)benzylidene ruthenium dichloride as a Grubbs' catalyst was added thereto such that the amount of the Grubbs' catalyst was 0.25 parts relative to 100 parts of the polymer. The internal pressure of the reactor was raised to 3.5 MPa with ethylene as a co-olefin, and a metathesis reaction of the polymer was carried out at a stirring rate of 600 rpm. During the reaction, a constant temperature was maintained using a cooling coil connected to a temperature controller and a heat sensor.

Next, the inside of the reactor was degassed three times with 0.7 MPa H$_2$ while continuing stirring. The temperature of the reactor was then raised to 50° C., and 1 L of a monochlorobenzene solution containing Wilkinson's catalyst and triphenylphosphine was added to the reactor. The amount of Wilkinson's catalyst was 0.075 parts per 100 parts of the polymer, and the amount of triphenylphosphine was 1 part per 100 parts of the polymer. The temperature was then maintained at 50° C. while performing a hydrogenation reaction of the polymer under a hydrogen pressure (gauge pressure) of 8.4 MPa, and the reaction was ended with an iodine value of 5 mg/100 mg as the end point. After the reaction had ended, 0.2 parts of activated carbon having an average diameter of 15 μm was added into the reactor and was stirred for 30 minutes. Thereafter, filtration was carried out using a filter having a pore diameter of 5 µm. Steam was introduced into the filtrate, and monochlorobenzene was removed and recovered through steam distillation. Precipitated polymer (hydrogenated polymer) was recovered by separation and drying.

After sampling 64 parts in terms of solid content of a water dispersion of the obtained hydrogenated polymer, 800 parts of N-methylpyrrolidone (NMP) as a solvent was added thereto, and then water was evaporated under reduced pressure to yield an NMP solution containing the hydrogenated polymer.

Comparative Example 2

Various operations and evaluations were performed in the same way as in Example 1 with the exception that a dispersant composition containing a hydrogenated polymer produced as described below was used instead of the specific dispersant composition. The results are shown in Table 1. The viscosity of the conductive material dispersion liquid produced in this example, measured as previously described, was 21 Pa·s. Moreover, a "peak" of a specific size was not detected in a particle diameter range of not less than 5 µm and not more than 30 µm in a particle diameter distribution.
<Production of Dispersant Composition>

A pre-hydrogenation polymer was produced by a batch process in a stirring autoclave having a capacity of 2 m$^3$. In each batch, 350 kg of a monomer composition (acrylonitrile:1,3-butadiene=35:65 (by mass)) and 700 kg (total amount) of water were used. First, the autoclave was charged with 9.8 kg of Erkantol® BXG (Erkantol is a registered trademark in Japan, other countries, or both), 2.94 kg of Baykanol® PQ (Baykanol is a registered trademark in Japan, other countries, or both), and 1.96 kg of coconut fatty acid potassium salt as emulsifiers in 600 kg of water together with 180 g of potassium hydroxide, and was purged using a stream of nitrogen. After the nitrogen purging was complete, monomers (196 kg of butadiene and 154 kg of acrylonitrile) from which a stabilizer had been removed and one portion of tert-dodecyl mercaptan (0.4 parts relative to 100 parts of monomer composition) were added into the reactor. The reactor was subsequently closed. The remaining amount of water (100 kg) was used to produce an aqueous solution of tris(α-hydroxyethyl)amine and potassium peroxodisulfate and a polymerization inhibitor solution. Aqueous solution containing 950 g of potassium peroxodisulfate (0.27 parts) and 530 g of tris(α-hydroxyethyl)amine (0.15 parts) was added to thereby initiate polymerization at 20° C., and this temperature was maintained throughout the entire polymerization time. Progression of polymerization was monitored in each case through weight analysis of the conversion rate. Once the polymerization conversion rate was 15%, further tert-dodecyl mercaptan (0.4 parts relative to 100 parts of monomer composition) was added. After 7 hours of polymerization time, an aqueous solution of sodium dithionite/N,N-diethylhydroxylamine (DEHA) and potassium hydroxide was added to terminate polymerization. The polymerization conversion rate was 85%. Steam distillation was performed so as to remove unconverted monomer and other volatile components.

In addition, 0.25 parts of dibutylhydroxytoluene as an antioxidant was added to a water dispersion of a polymerization reaction product obtained in this manner.

Next, a 25 mass % aqueous solution of calcium chloride was added under stirring such that the amount of calcium chloride was 2.37 parts relative to 100 parts of polymerized product solid content in the obtained water dispersion, and the polymerized product in the water dispersion was caused to coagulate. Thereafter, the polymerized product was separated by filtration, 50 equivalents of deionized water relative to the obtained polymerized product was passed to perform water washing, and then drying was performed at 70° C. under reduced pressure to yield a pre-hydrogenation polymer.

Next, a hydrogenation reaction was performed with a hydrogen pressure of 190 bar, a temperature of 138° C., and a solid content of 17.5%. Note that the hydrogenation reaction was performed using 0.15% of tris(triphenylphosphine)rhodium(I) chloride (Evonik-Degussa) as a catalyst and 0.2 phr of triphenylphosphine (Merck Schuchardt OHG; Catalogue No. 8.08270) as a promotor based on 100 g of the pre-hydrogenation polymer (phr).

In the hydrogenation reaction, 5.25 kg of the pre-hydrogenation polymer was dissolved in 24.25 kg of chlorobenzene to obtain a polymer solution in a 40 L autoclave. Prior to the hydrogenation reaction, this polymer solution was continuously brought into contact with nitrogen (20 bar) once and hydrogen (20 bar) twice under stirring, and was then depressurized. This reaction mixture was heated to 120° C. and was brought into contact with 190 bar of hydrogen. In the next step, 10.5 g of the triphenylphosphine promotor as a solution in 250 g of chlorobenzene was added by metered injection. Hydrogenation was then initiated through addition of 7.875 g of tris(triphenylphosphine)rhodium(I) chloride dissolved in 250 g of chlorobenzene. The internal temperature gradually increased to 138° C. as the reaction diminished. Online monitoring of the hydrogenation process was performed through measurement of hydrogen absorption. Once the percentage hydrogenation reached 99.4±0.2%, the reaction mixture was cooled to quench the hydrogenation. Next, this batch was depressurized. Nitrogen was then passed so as to remove remaining hydrogen. After the hydrogenation reaction had ended, 0.2 parts of activated carbon having an average diameter of 15 µm was added into the reactor and was stirred for 30 minutes. Thereafter, filtration was carried out using a filter having a pore diameter of 5 µm. Steam was introduced into the filtrate, and monochlorobenzene was removed and recovered through steam distillation. Precipitated hydrogenated product was recovered by separation and drying. A specific amount of the obtained polymer was dissolved in NMP to obtain an NMP solution having the polymer dissolved with a solid content concentration of 8% in NMP.

Comparative Example 3

Various operations and evaluations were performed in the same way as in Example 1 with the exception that in production of the dispersant composition, an antioxidant was not compounded, the polymerization temperature was changed to 60° C., and the drying temperature was changed to 120° C. such that a polymer satisfying a value (A) for volume-average particle diameter D50 and a value (B) for a specific particle diameter indicated in Table 1 was obtained. The results are shown in Table 1. The viscosity of the conductive material dispersion liquid produced in this example, measured as previously described, was at least 50 Pa·s (exceeding device limit of detection).

Note that in Table 1, shown below:
"AN" indicates acrylonitrile monomer;
"BD" indicates butadiene monomer;
"BHT" indicates dibutylhydroxytoluene;
"PVdF" indicates polyvinylidene fluoride;
"CNT" indicates carbon nanotubes; and
"AB" indicates acetylene black.

TABLE 1

|  |  | Examples ||||||| 
|---|---|---|---|---|---|---|---|---|
|  |  | 1 | 2 | 3 | 4 | 5 | 6 | 7 |
| Monomer composition | Nitrile group-containing monomer (AN, parts by mass) | 35 | 35 | 12 | 55 | 35 | 35 | 35 |
|  | Conjugated diene monomer (BD, parts by mass) | 65 | 65 | 88 | 45 | 65 | 65 | 65 |
| Polymer (dispersant) | Inclusion of nitrile group-containing monomer unit | Yes | Yes | Yes | Yes | Yes | Yes | Yes |
|  | Inclusion of alkylene structural unit | Yes | Yes | Yes | Yes | Yes | Yes | Yes |
|  | Iodine value (mg/100 mg) | 5 | 5 | 5 | 5 | 55 | 5 | 5 |
|  | Value (B) for particle diameter of largest peak in range of not less than 5 μm and not more than 30 μm (μm) | 12 | 9 | 12 | 12 | 12 | 18 | 18 |
|  | Value (A) for volume-average particle diameter D50 (nm) | 300 | 250 | 200 | 500 | 250 | 500 | 600 |
|  | B/A (—) | 40 | 36 | 60 | 24 | 48 | 36 | 30 |
| Conductive material | Type | CNT | CNT | CNT | CNT | CNT | CNT | CNT |
|  | BET specific surface area (m$^2$/g) | 250 | 250 | 250 | 250 | 250 | 250 | 250 |
| Substituted phenol compound | Type | BHT | BHT | BHT | BHT | BHT | BHT | BHT |
|  | Content (mass %; based on polymer) | 0.1 | 0.15 | 0.1 | 0.1 | 0.1 | 0.1 | 0.1 |
| Conductive material dispersion liquid | Conductive material (parts by mass) | 5 | 5 | 5 | 5 | 5 | 5 | 5 |
|  | Dispersant (parts by mass) | 1 | 1 | 1 | 1 | 1 | 1 | 1 |
|  | Dispersant/conductive material (—) | 0.2 | 0.2 | 0.2 | 0.2 | 0.2 | 0.2 | 0.2 |
| Electrode slurry composition | Electrode active material (parts by mass) | 100 | 100 | 100 | 100 | 100 | 100 | 100 |
|  | Total amount of conductive material + dispersant (parts by mass) | 1 | 1 | 1 | 1 | 1 | 1 | 1 |
|  | Dispersant/conductive material (—) | 0.2 | 0.2 | 0.2 | 0.2 | 0.2 | 0.2 | 0.2 |
|  | Binder (PVdF, parts by mass) | 1.1 | 1.1 | 1.1 | 1.1 | 1.1 | 1.1 | 1.1 |
| Evaluation | Slurry stability over time | A | A | B | B | B | B | B |
|  | Rate characteristics | A | A | A | B | B | C | C |
|  | High-temperature storage characteristics | A | A | B | A | B | A | B |

|  |  | Examples ||| Comparative examples ||| 
|---|---|---|---|---|---|---|---|
|  |  | 8 | 9 | 10 | 1 | 2 | 3 |
| Monomer composition | Nitrile group-containing monomer (AN, parts by mass) | 35 | 35 | 35 | 35 | 35 | 35 |
|  | Conjugated diene monomer (BD, parts by mass) | 65 | 65 | 65 | 65 | 65 | 65 |
| Polymer (dispersant) | Inclusion of nitrile group-containing monomer unit | Yes | Yes | Yes | Yes | Yes | Yes |
|  | Inclusion of alkylene structural unit | Yes | Yes | Yes | Yes | Yes | Yes |
|  | Iodine value (mg/100 mg) | 5 | 5 | 5 | 5 | 5 | 5 |
|  | Value (B) for particle diameter of largest peak in range of not less than 5 μm and not more than 30 μm (μm) | 12 | 19 | 12 | No peak | No peak | 25 |
|  | Value (A) for volume-average particle diameter D50 (nm) | 80 | 80 | 300 | 200 | 200 | 900 |
|  | B/A (—) | 150 | 238 | 40 | — | — | 28 |
| Conductive material | Type | CNT | CNT | AB | CNT | CNT | CNT |
|  | BET specific surface area (m$^2$/g) | 250 | 250 | 133 | 250 | 250 | 250 |
| Substituted phenol compound | Type | BHT | BHT | BHT | — | BHT | — |
|  | Content (mass %; based on polymer) | 0.1 | 0.1 | 0.1 | — | 0.25 | — |
| Conductive material dispersion liquid | Conductive material (parts by mass) | 5 | 5 | — | 5 | 5 | 5 |
|  | Dispersant (parts by mass) | 1 | 1 | — | 1 | 1 | 1 |
|  | Dispersant/conductive material (—) | 0.2 | 0.2 | — | 0.2 | 0.2 | 0.2 |
| Electrode slurry composition | Electrode active material (parts by mass) | 100 | 100 | 100 | 100 | 100 | 100 |
|  | Total amount of conductive material + dispersant (parts by mass) | 1 | 1 | 3.3 | 1 | 1 | 1 |
|  | Dispersant/conductive material (—) | 0.2 | 0.2 | 0.05 | 0.2 | 0.2 | 0.2 |
|  | Binder (PVdF, parts by mass) | 1.1 | 1.1 | 1.1 | 1.1 | 1.1 | 1.1 |
| Evaluation | Slurry stability over time | A | B | A | C | D | D |
|  | Rate characteristics | A | C | A | D | D | D |
|  | High-temperature storage characteristics | A | A | A | B | C | D |

It can be seen from Table 1 that through dispersant compositions containing the polymers according to Examples 1 to 10, which were each a polymer including a nitrile group-containing monomer unit and an alkylene structural unit and for which, upon measurement by dynamic light scattering, a value (A) for volume-average particle diameter D50 was not less than 50 nm and not more than 800 nm and one or more peaks were detected in a particle diameter range of not less than 5 μm and not more than 30 μm, it was possible to produce a slurry composition having excellent dispersion state stability over time and to enhance rate characteristics and high-temperature storage characteristics of an obtained electrochemical device.

In contrast, it can be seen that a balance of high levels of dispersion state stability over time of an obtained slurry composition and rate characteristics and high-temperature storage characteristics of an obtained electrochemical device could not be achieved when using dispersant compositions containing the polymers of Comparative Examples 1 and 2 for which a peak was not detected in a particle diameter range of not less than 5 μm and not more than 30 μm upon measurement by dynamic light scattering and the polymer of Comparative Example 3 for which a value (A) detected for volume-average particle diameter D50 upon measurement by dynamic light scattering was more than 800 nm.

INDUSTRIAL APPLICABILITY

According to the present disclosure, it is possible to provide a dispersant composition for a non-aqueous secondary battery and a conductive material dispersion liquid for an electrochemical device containing this dispersant composition that can produce a slurry composition having excellent dispersion state stability over time and that can enhance rate characteristics and high-temperature storage characteristics of an obtained electrochemical device.

Moreover, according to the present disclosure, it is possible to provide a slurry composition for an electrochemical device electrode, and method of producing the same, that has excellent dispersion state stability over time and that can enhance rate characteristics and high-temperature storage characteristics of an obtained electrochemical device.

Furthermore, according to the present disclosure, it is possible to provide an electrode for an electrochemical device that can sufficiently improve rate characteristics and high-temperature storage characteristics of an electrochemical device and an electrochemical device that has excellent rate characteristics and high-temperature storage characteristics.

The invention claimed is:

1. A dispersant composition for an electrochemical device comprising a polymer including a nitrile group-containing monomer unit and an alkylene structural unit, wherein
the alkylene structural unit is a repeating unit represented by a general formula: $-C_nH_{2n}-$ (n is an integer of 2 or more),
upon measurement of the polymer by dynamic light scattering, a value (A) detected for volume-average particle diameter D50 is not less than 50 nm and not more than 450 nm, and one or more peaks are detected in a particle diameter range of not less than 5 μm and not more than 30 μm, wherein the one or more peaks detected in the range of not less than 5 μm and not more than 30 μm corresponds to size of clusters formed by a plurality of polymer molecules, and
when a value for a particle diameter corresponding to a largest peak among the one or more peaks that are detected in the particle diameter range of not less than 5 μm and not more than 30 μm upon measurement of the polymer by dynamic light scattering is taken to be (B),
a parameter (B/A) that is obtained by dividing the value (B) for the particle diameter by the value (A) for the volume-average particle diameter D50 has a value of not less than 7 and not more than 200, and
an iodine value of the polymer is 50 mg/100 mg or less.

2. The dispersant composition for an electrochemical device according to claim 1, wherein proportional content of the nitrile group-containing monomer unit in the polymer is not less than 10 mass % and not more than 60 mass %.

3. The dispersant composition for an electrochemical device according to claim 1, further comprising not less than 0.01 mass % and not more than 0.2 mass % of a substituted phenol compound based on total mass of the polymer.

4. A conductive material dispersion liquid for an electrochemical device comprising: a conductive material; a solvent; and the dispersant composition for an electrochemical device according to claim 1.

5. A slurry composition for an electrochemical device electrode comprising: an electrode active material; a conductive material; and the dispersant composition for an electrochemical device according to claim 1.

6. A method of producing the slurry composition for an electrochemical device electrode according to claim 5 comprising:
a first step of mixing the polymer, the conductive material, and a solvent to produce a conductive material dispersion liquid; and
a second step of mixing the conductive material dispersion liquid obtained in the first step and the electrode active material.

7. An electrode for an electrochemical device comprising an electrode mixed material layer formed using the slurry composition for an electrochemical device electrode according to claim 5.

8. An electrochemical device comprising the electrode for an electrochemical device according to claim 7.

9. The dispersant composition for an electrochemical device according to claim 1, wherein an iodine value of the polymer is 1 mg/100 mg or more and 40 mg/100 mg or less.

* * * * *